(12) United States Patent
Takahashi et al.

(10) Patent No.: US 9,388,082 B2
(45) Date of Patent: Jul. 12, 2016

(54) POROUS MOLDED PRODUCT AND PROCESS FOR PRODUCING THE SAME, CARRIER FOR CATALYSTS, AND CATALYST

(75) Inventors: Shinji Takahashi, Hiroshima-ken (JP); Naoya Kobayashi, Hiroshima-ken (JP)

(73) Assignee: TODA KOGYO CORPORATION, Hiroshima (JP)

( * ) Notice: Subject to any disclaimer, the term of this patent is extended or adjusted under 35 U.S.C. 154(b) by 0 days.

(21) Appl. No.: 12/810,232

(22) PCT Filed: Dec. 25, 2008

(86) PCT No.: PCT/JP2008/003971
§ 371 (c)(1),
(2), (4) Date: Aug. 2, 2010

(87) PCT Pub. No.: WO2009/084208
PCT Pub. Date: Jul. 9, 2009

(65) Prior Publication Data
US 2010/0298133 A1    Nov. 25, 2010

(30) Foreign Application Priority Data

Dec. 28, 2007   (JP) .................................. 2007-339793

(51) Int. Cl.
| | | |
|---|---|---|
| C08F 4/02 | (2006.01) |
| C04B 35/195 | (2006.01) |
| B01J 8/06 | (2006.01) |
| B01J 21/10 | (2006.01) |
| B01J 23/755 | (2006.01) |
| B01J 23/78 | (2006.01) |
| B01J 35/00 | (2006.01) |
| B01J 35/10 | (2006.01) |
| B01J 37/00 | (2006.01) |
| C01B 3/16 | (2006.01) |
| C01B 3/40 | (2006.01) |
| C01B 3/58 | (2006.01) |
| C04B 35/443 | (2006.01) |
| C04B 38/00 | (2006.01) |
| B01J 21/16 | (2006.01) |
| B01J 23/00 | (2006.01) |
| C04B 111/00 | (2006.01) |

(52) U.S. Cl.
CPC .............. *C04B 35/195* (2013.01); *B01J 8/06* (2013.01); *B01J 21/10* (2013.01); *B01J 23/755* (2013.01); *B01J 23/78* (2013.01); *B01J 35/006* (2013.01); *B01J 35/1014* (2013.01); *B01J 35/1038* (2013.01); *B01J 35/1061* (2013.01); *B01J 37/0009* (2013.01); *B01J 37/0018* (2013.01); *C01B 3/16* (2013.01); *C01B 3/40* (2013.01); *C01B 3/583* (2013.01); *C01B 3/586* (2013.01); *C04B 35/443* (2013.01); *C04B 38/0006* (2013.01); *B01J 21/16* (2013.01); *B01J 23/005* (2013.01); *B01J 23/007* (2013.01); *C01B 2203/044* (2013.01); *C01B 2203/047* (2013.01); *C01B 2203/0445* (2013.01); *C04B 2111/0081* (2013.01); *C04B 2111/00793* (2013.01); *C04B 2235/322* (2013.01); *C04B 2235/3218* (2013.01); *C04B 2235/349* (2013.01); *C04B 2235/5409* (2013.01); *C04B 2235/6021* (2013.01); *C04B 2235/95* (2013.01)

(58) Field of Classification Search
USPC ........................................................ 502/341
See application file for complete search history.

(56) References Cited

U.S. PATENT DOCUMENTS

| 4,656,156 A | 4/1987 | Misra |
|---|---|---|
| 7,196,036 B2 | 3/2007 | Kobayashi et al. |
| 2002/0169065 A1* | 11/2002 | Kawazu ............... C04B 35/185 501/80 |
| 2003/0047488 A1 | 3/2003 | Takehira et al. |
| 2004/0209773 A1* | 10/2004 | Kobayashi ........... B01J 35/0006 502/341 |
| 2006/0028921 A1* | 2/2006 | Wang ................... G04B 19/305 368/238 |
| 2007/0021299 A1 | 1/2007 | Takehira et al. |

(Continued)

FOREIGN PATENT DOCUMENTS

| EP | 1 285 692 A1 | 2/2003 |
|---|---|---|
| EP | 1 449 581 A1 | 8/2004 |

(Continued)

OTHER PUBLICATIONS

English translation of the International Preliminary Report on Patentability in PCT/JP2008/003971 dated Aug. 19, 2010.

(Continued)

*Primary Examiner* — Melvin C Mayes
*Assistant Examiner* — Colette Nguyen
(74) *Attorney, Agent, or Firm* — Nixon & Vanderhye P.C.

(57) ABSTRACT

The present invention aims at providing a porous molded product comprising magnesium and aluminum which is satisfactory in both of a specific surface area and mechanical properties, can be suitably used as filters, drying agents, adsorbents, purifying agents, deodorants, carriers for catalysts, etc., includes a large amount of micropores, and has a large specific surface area and a high strength, as well as a process for producing the porous molded product. The porous molded product of the present invention comprises at least magnesium and aluminum, and having a magnesium content of 10 to 50% by weight in terms of a magnesium atom, an aluminum content of 5 to 35% by weight in terms of an aluminum atom, a pore volume of 0.01 to 0.5 cm³/g, an average pore diameter of not more than 300 Å and an average collapse strength of not less than 3 kg, and can be produced by molding hydrotalcite comprising at least magnesium and aluminum and then calcining the resulting molded product at a temperature of 500 to 1500° C.

9 Claims, No Drawings

(56) References Cited

U.S. PATENT DOCUMENTS

2007/0036713 A1    2/2007  Kobayashi et al.
2007/0167323 A1*   7/2007  Kobayashi ............... B01J 21/04
                                                          502/341
2010/0254892 A1*  10/2010  Takahashi .............. B01J 23/007
                                                          423/651

FOREIGN PATENT DOCUMENTS

| | | |
|---|---|---|
| EP | 1 808 226 A1 | 7/2007 |
| JP | 2004-255245 | 9/2004 |
| JP | 2007-326756 | 12/2007 |
| WO | WO 2007/004424 | 1/2007 |

OTHER PUBLICATIONS

Notice of Reason for Rejection and English translation in JP 2008-334432 issued Feb. 21, 2012.

Extended European Search Report in EP 08 86 8580 mailed Nov. 2, 2011.

\* cited by examiner

POROUS MOLDED PRODUCT AND PROCESS FOR PRODUCING THE SAME, CARRIER FOR CATALYSTS, AND CATALYST

This application is the U.S. national phase of International Application No. PCT/JP2008/003971 filed 25 Dec. 2008, which designated the U.S. and claims priority to JP Application No. 2007-339793 filed 28 Dec. 2007, the entire contents of each of which are hereby incorporated by reference.

TECHNICAL FIELD

The present invention relates to a porous molded product comprising at least magnesium and aluminum, and a process for producing the porous molded product. More particularly, the present invention aims to provide a porous molded product comprising magnesium and aluminum which is satisfactory in both of a specific surface area and mechanical properties, can be suitably used as filters, drying agents, adsorbents, purifying agents, deodorants, carriers for catalysts, etc., includes a large amount of micropores, and has a large specific surface area and a high strength, as well as a process for producing the porous molded product.

In addition, the present invention aims at providing a porous molded product comprising magnesium and aluminum which can be industrially mass-produced and is excellent in anti-sulfur poisoning property.

BACKGROUND ART

Hitherto, ceramic porous materials have been used in extensive applications such as various filters (for gas separation, solid separation, sterilization, dust removal, etc.), drying agents, adsorbents, purifying agents, deodorants, carriers for catalysts, sound absorbing materials, heat insulating materials and sensors, or the like, because they are excellent in heat resistance, impact resistance, chemical resistance and strength characteristics at an ordinary temperature and a high temperature, and have a reduced weight. Thus, the ceramic porous materials have now become an indispensable industrial material.

The ceramic porous materials used in the above applications are required to satisfy various properties such as pore distribution and pore volume. For example, the ceramic porous materials used as a carrier for catalysts are required to have a large pore volume so as to support a large amount of a catalyst component thereon. In addition, when used a carrier for catalysts or an adsorbent in a fixed bed facility, the ceramic porous materials are required to have a high strength so as not to suffer from collapse upon removal or filling of the catalysts. Therefore, there is a demand for the ceramic molding product capable of exhibiting both of the properties, i.e., a large pore volume and a high strength.

However, in recent years, in the application fields such as the filters and the carriers for catalysts, the ceramic porous materials have been required to exhibit a larger specific surface area, a higher strength and a more excellent heat resistance. Therefore, it may become difficult for the conventional ceramic porous materials to satisfy all of these requirements. Porous alumina used as various filters or carriers for catalysts mainly comprises γ-alumina. However, the γ-alumina tends to undergo phase transfer into α-alumina as a stabilized phase when exposed to a high temperature near 1000° C., thereby causing the problems such as considerable reduction in specific surface area and therefore lack of its function as a carrier for catalysts.

General alumina-based molded products and magnesia molded products have been conventionally reported (Patent Documents 1 to 4).

Patent Document 1: Japanese Patent Application Laid-Open (KOKAI) No. 2003-48768

Patent Document 2: Japanese Patent Application Laid-Open (KOKAI) No. 2007-117916

Patent Document 3 Japanese Patent Application Laid-Open (KOKAI) No. 2004-168629

Patent Document 4: Japanese Patent Application Laid-Open (KOKAI) No. 2003-284949

DISCLOSURE OF THE INVENTION

Problems to be Solved by the Invention

In the above Patent Document 1, there is described the α-alumina molded product having a high mechanical strength. However, the molded product tends to exhibit a small BET specific surface area.

In the above Patent Documents 2 and 3, there are described the alumina molded products having a large pore volume and a large BET specific surface area. However, these molded products tend to be deteriorated in mechanical strength.

In the above Patent Document 4, there is described a high-strength molded product which is produced from magnesia by a compression molding method. Although there are no descriptions concerning BET specific surface area, pore volume, etc., it is easily suggested that the molded product has a small BET specific surface area and a small pore volume.

The ceramic porous materials generally used are in the form of an α-alumina molded product. However, the α-alumina molded product is sintered at a high temperature to enhance a collapse strength thereof and, therefore, tends to have a small specific surface area.

In addition, many molded products produced from γ-alumina, α-alumina, silica, zeolite, etc., have been conventionally reported. However, among these conventional molded products, there have been reported no molded products comprising a large amount of magnesium and having a large specific surface area and a high collapse strength.

Further, there has not been reported any method of producing a molded product from hydrotalcite as a precursor.

There are conventionally present various reports concerning a compaction-molded product formed from a porous powder. However, the molded product tends to be insufficient in mechanical strength, have limitation to its moldable shape, and suffer from problems such as damage due to removal of the powder therefrom, etc.

In the production of a sintered body in which an inorganic binder is compounded with porous particles, the thus compounded inorganic binder tends to cause deterioration in performance of the resulting sintered body owing to clogging of pores in the respective porous particles therewith. If a large amount of the inorganic binder is added to enhance a mechanical strength of the sintered body, there tend to occur the problems including not only increase in its weight but also deteriorated performance of the porous structure. Furthermore, since the sintering must be carried out at a high temperature to achieve a high strength of the resulting sintered body, a crystal structure of the porous particles tends to be deteriorated, resulting in damage to pores and specific surface area thereof as well as inevitable increase in thermal energy costs.

In consequence, the present invention relates to a porous molded product comprising at least magnesium and aluminum and a process for producing the porous molded product.

More specifically, an object of the present invention is to provide a porous molded product comprising magnesium and aluminum which is satisfactory in both of a specific surface area and mechanical properties, can be suitably used as filters, drying agents, adsorbents, purifying agents, deodorants, carriers for catalysts, etc., includes a large amount of micropores, and has a large specific surface area and a high strength, as well as a process for producing the porous molded product.

In addition, another object of the present invention is to provide a porous molded product comprising magnesium and aluminum which can be industrially mass-produced and is excellent in anti-sulfur poisoning property.

Means for Solving the Problems

The above-described objects can be achieved by the following aspects of the present invention.

That is, according to the present invention, there is provided a porous molded product comprising at least magnesium and aluminum, and having a magnesium content of 10 to 50% by weight in terms of a magnesium atom, an aluminum content of 5 to 35% by weight in terms of an aluminum atom, a pore volume of 0.01 to 0.5 $cm^3/g$, an average pore diameter of not more than 300 Å and an average collapse strength of not less than 3 kg (Invention 1).

Also, according to the present invention, there is provided the above porous molded product having a BET specific surface area of 10 to 100 $m^2/g$ (Invention 2).

Also, according to the present invention, there is provided the above molded product which is produced by molding hydrotalcite comprising magnesium and aluminum and then calcining the resulting molded product at a temperature of 500 to 1500° C. (Invention 3).

Also, according to the present invention, there is provided a carrier for catalysts which comprises the porous molded product as defined in any one of the above Inventions 1 to 3 (Invention 4).

In addition, according to the present invention, there is provided a catalyst produced by using the porous molded product as defined in any one of the above Inventions 1 to 3 (Invention 5).

Effect of the Invention

The porous molded product according to the present invention comprises at least magnesium and aluminum, and has not only a large BET specific surface area and a large pore volume but also an excellent mechanical strength.

The porous molded product according to the present invention is satisfactory in both of a specific surface area and mechanical properties, and can be suitably used as filters, drying agents, adsorbents, purifying agents, deodorants, carriers for catalysts, etc.

The porous molded product obtained according to the present invention can exhibit a high specific surface area and a high strength even when held in a high temperature condition and, therefore, is useful as a carrier for catalysts which is used to support a catalyst component thereon in various catalyst such as steam reforming catalysts used in a high temperature condition, catalysts for production of dimethyl ether by dehydration of methanol, catalysts for CO shift reaction, catalysts for CO selective oxidation and methanation catalysts.

In addition, the porous molded product according to the present invention comprises a large amount of magnesium and, therefore, can be used as a carrier for a catalyst capable of reforming hydrocarbons such as city gases and LPG which usually tend to comprise a large amount of sulfur components.

PREFERRED EMBODIMENT FOR CARRYING OUT THE INVENTION

First, the porous molded product according to the present invention is described.

The porous molded product according to the present invention is formed of a compound comprising at least magnesium and aluminum. The porous molded product may also comprise, in addition to magnesium and aluminum, other elements such as sodium, calcium, silicon, iron, nickel and zinc although not particularly limited thereto. As other components which may also be included in the porous molded product, there are mentioned those derived from the raw materials which tend to remain in the porous molded product even after subjected to the heat treatment explained below in the production process. Examples of the other components include oxygen, a hydroxyl group, an oxalic acid group, a sulfuric acid group, a sulfurous acid group, a nitric acid group, chlorine, a citric acid group, a carbonic acid group, a benzoic acid group, an acetic acid group and an ammonium group.

The content of magnesium in the porous molded product according to the present invention is 10 to 50% by weight in terms of a magnesium atom. When the magnesium content is less than 10% by weight, the resulting molded product tends to have a small BET specific surface area and, therefore, may fail to form a porous structure. On the other hand, when the magnesium content is more than 50% by weight, the resulting molded product tends to be deteriorated in mechanical strength. The magnesium content in the porous molded product is preferably 15 to 45% by weight and more preferably 20 to 40% by weight.

Also, the content of aluminum in the porous molded product according to the present invention is 5 to 35% by weight in terms of an aluminum atom. When the aluminum content is less than 5% by weight, the resulting molded product tends to be deteriorated in mechanical strength. On the other hand, when the aluminum content is more than 35% by weight, the resulting molded product tends to have a small BET specific surface area and, therefore, may fail to form a porous structure. The aluminum content in the porous molded product is preferably 8 to 35% by weight and more preferably 10 to 30% by weight.

The ratio of the magnesium atom and the aluminum atom in the porous molded product according to the present invention is not particularly limited, and it is preferred that the magnesium atom be present in a larger amount than that of the aluminum atom. The molar ratio of the magnesium atom to the aluminum atom (Mg:Al) is preferably 5:1 to 1:1. When the proportion of the magnesium atom is more than the above-specified range, it may be difficult to readily obtain a molded product having a sufficient strength. On the other hand, when the proportion of the magnesium atom is less than the above-specified range, the resulting molded product may fail to exhibit properties as a porous substance.

The porous molded product according to the present invention has a pore volume of 0.01 to 0.5 $cm^3/g$. When the pore volume is less than 0.01 $cm^3/g$, the resulting porous molded product may fail to provide a carrier having a sufficient pore volume. When the pore volume is more than 0.5 $cm^3/g$, the resulting porous molded product may fail to support and disperse a sufficient amount of active metals thereover when used as a carrier for catalysts. The pore volume of the porous molded product is preferably 0.02 to 0.45 cm$^3$/g and more preferably 0.05 to 0.40 cm$^3$/g. Meanwhile, the pore volume of the porous molded product which lies in the above-described range can be attained, for example, by using a laminar composite hydroxide and a combustible substance as precursors thereof and further controlling calcining conditions therefor.

The porous molded product according to the present invention has an average pore diameter of not more than 300 Å. When the average pore diameter is more than 300 Å, the resulting porous molded product may fail to support and disperse a sufficient amount of active metals thereover when used as a carrier for catalysts. The average pore diameter of the porous molded product is preferably 20 to 280 Å and more preferably 50 to 250 Å. Meanwhile, the average pore diameter of the porous molded product which lies in the above-described range can be attained, for example, by using a laminar composite hydroxide and a combustible substance as precursors thereof and further controlling calcining conditions therefor.

The porous molded product according to the present invention preferably has a BET specific surface area of 10 to 100 m$^2$/g. When the BET specific surface area is less than 10 m$^2$/g, the average pore diameter of the resulting molded product tends to be too large, so that the molded product may fail to support and disperse a sufficient amount of active metals thereover when used as a carrier for catalysts. The molded product having a BET specific surface area of more than 100 m$^2$/g may be difficult to industrially produce and, therefore, tends to be unpractical. The BET specific surface area of the porous molded product is more preferably 15 to 90 m$^2$/g and still more preferably 20 to 80 m$^2$/g.

The porous molded product according to the present invention has an average collapse strength of not less than 3 kg. When the average collapse strength is less than 3 kg, the resulting molded product tends to be collapsed or broken when used at a high temperature. The average collapse strength of the porous molded product is preferably 4 to 50 kg and more preferably 5 to 40 kg.

Next, the process for producing the porous molded product according to the present invention is described.

In the process for producing the porous molded product according to the present invention, the porous molded product can be produced by molding hydrotalcite compound particles comprising magnesium and aluminum as a precursor and then heat-treating the resulting molded product in a temperature range of 500 to 1500° C.

The hydrotalcite compound particles comprising magnesium and aluminum used in the present invention are obtained by mixing an anion-containing alkaline aqueous solution, a magnesium raw material and an aluminum salt aqueous solution with each other to prepare a mixed solution having a pH value of 7.0 to 13.0, aging the resulting mixed solution in a temperature range of 50 to 300° C., and then subjecting the resulting mixture to separation by filtration and drying.

The aging time is not particularly limited and is 1 to 80 hr, preferably 3 to 24 hr and more preferably 5 to 18 hr. When the aging time is more than 80 hr, the growth reaction tends to excessively proceed, resulting in industrially disadvantageous process.

The magnesium salt and the aluminum salt is not particularly limited as long as they are in the form of a water-soluble salt such as a nitric acid salt.

Examples of the magnesium raw material used in the above method include magnesium oxide, magnesium hydroxide, magnesium oxalate, magnesium sulfate, magnesium sulfite, magnesium nitrate, magnesium chloride, magnesium citrate, basic magnesium carbonate and magnesium benzoate.

Examples of the aluminum raw material used in the above method include aluminum oxide, aluminum hydroxide, aluminum acetate, aluminum chloride, aluminum nitrate, aluminum oxalate and basic aluminum ammonium sulfate.

The hydrotalcite compound particles comprising magnesium and aluminum as a precursor of the porous molded product according to the present invention preferably have an average plate surface diameter of 0.05 to 0.4 μm. When the average plate surface diameter of the hydrotalcite compound particles is less than 0.05 μm, it may be difficult to subject the resulting particles to separation by filtration and washing with water, so that it may be difficult to industrially produce the hydrotalcite compound particles. On the other hand, when the average plate surface diameter of the hydrotalcite compound particles is more than 0.4 μm, it may be difficult to produce a porous molded product therefrom.

The hydrotalcite compound particles used in the present invention preferably have a crystallite size D006 of 0.001 to 0.08 μm. When the crystallite size D006 of the hydrotalcite compound particles is less than 0.001 μm, the viscosity of the resulting water suspension tends to be too high, so that it may be difficult to industrially produce the hydrotalcite compound particles. When the crystallite size D006 of the hydrotalcite compound particles is more than 0.08 μm, it may be difficult to produce the aimed catalyst molded product therefrom. The crystallite size D006 of the hydrotalcite compound particles is more preferably 0.002 to 0.07 μm.

The hydrotalcite compound particles comprising magnesium and aluminum used in the present invention preferably have a BET specific surface area of 3.0 to 300 m$^2$/g. When the BET specific surface area of the hydrotalcite compound particles is less than 3.0 m$^2$/g, it may be difficult to produce the aimed porous molded product. When the BET specific surface area of the hydrotalcite compound particles is more than 300 m$^2$/g, the viscosity of the resulting water suspension tends to be too high, and it may also be difficult to subject the suspension to separation by filtration and washing with water. As a result, it may be difficult to industrially produce the hydrotalcite compound particles. The BET specific surface area of the hydrotalcite compound particles is more preferably 5.0 to 250 m$^2$/g.

The ratio of the magnesium atom to the aluminum atom in the hydrotalcite comprising magnesium and aluminum used in the present invention is not particularly limited. The molar ratio of the magnesium atom to the aluminum atom (Mg:Al) in the hydrotalcite is preferably 4:1 to 1:1.

The diameter of secondary agglomerated particles of the hydrotalcite compound particles is 0.1 to 200 μm. When the diameter of secondary agglomerated particles of the hydrotalcite compound particles is less than 0.1 μm, the resulting particles tend to be hardly subjected to pulverization treatment. As a result, it may be difficult to industrially produce the aimed particles. When the diameter of secondary agglomerated particles of the hydrotalcite compound particles is more than 200 μm, it may be difficult to produce the aimed molded product therefrom. The diameter of secondary agglomerated particles of the hydrotalcite compound particles is preferably 0.2 to 100 μm.

The pulverization treatment may be carried out using a general pulverizing device (such as an atomizer, YARIYA and a Henschel mixer).

In the process for producing the porous molding product according to the present invention, the hydrotalcite compound particles comprising at least magnesium and aluminum as a precursor of the porous molded product are mixed, if required, with a molding assistant and a binder and further with water and an alcohol as a dispersing medium, and the resulting mixture is kneaded into a clayey mass using a kneader (such as a screw kneader), followed by molding the resulting clayey mass. As the molding method, there may be used a compression molding method, a press molding method, a tablet molding method, etc.

The shape of the porous molded product according to the present invention is not particularly limited and may be any shape suitably used for ordinary catalysts. Examples of the shape of the porous molded product include a spherical shape, a cylindrical shape, a hollow cylindrical shape and a pellet shape.

The porous molded product having a spherical shape usually has a size of 1 to 10 mmφ) and preferably 2 to 8 mmφ).

The clayey kneaded material molded by the above method may be dried by various methods such as air drying, hot air drying and vacuum drying.

The thus dried clayey kneaded material is further heat-treated to obtain the porous molded product according to the present invention. The heat treatment may be carried out at a temperature of 500 to 1500° C. When the heat-treating temperature is lower than 500° C., the heat treatment tends to require a prolonged time to ensure a good collapse strength of the resulting molded product, resulting in industrial disadvantageous process. On the other hand, when the heat-treating temperature is higher than 1500° C., the resulting porous molded product tends to suffer from collapse of pores therein. The heat-treating temperature is preferably 500 to 1400° C. and more preferably 600 to 1300° C.

The heat-treating time is 1 to 72 hr. When the heat-treating time is shorter than 1 hr, the resulting molded product tends to be deteriorated in collapse strength. When the heat-treating time is longer than 72 hr, the resulting porous molded product tends to suffer from collapse of pores therein, and such a prolonged heat treatment tends to be disadvantageous from industrial viewpoints. The heat-treating time is preferably 2 to 60 hr and more preferably 3 to 50 hr.

Examples of the molding assistant include fatty acids, celluloses, polyvinyl alcohol, starches, methyl cellulose and carboxymethyl cellulose. The molding assistant is completely burned out by the calcination treatment and therefore dissipated from the porous molded product without any residues thereof. The amount of the molding assistant added may be, for example, 1 to 50 parts by weight based on 100 parts by weight of the hydrotalcite compound particles comprising magnesium and aluminum.

Examples of the binder include those binders having no re-miscibility with water such as α-alumina, an aluminum salt, silica, clay, talc, bentonite, zeolite, cordierite, a titania alkali metal salt, an alkali earth metal salt, a rare earth metal salt, zirconia, mullite, sepiolite, montmorillonite, halloysite, saponite, stevensite, hectorite, and silica alumina. In the case where a salt other than an oxide is added as the binder, it is important that the salt is decomposed into an oxide by the calcination treatment. The amount of the binder added may be, for example, 1 to 50 parts by weight based on 100 parts by weight of the hydrotalcite compound particles comprising magnesium and aluminum.

Examples of the alcohols include monohydric alcohols such as ethanol and propanol; glycols such as ethylene glycol, propylene glycol, butanediol and polyethylene glycol; and polyhydric alcohols such as glycerol. The amount of the alcohols added may be, for example, 50 to 150 parts by weight based on 100 parts by weight of the hydrotalcite compound particles comprising magnesium and aluminum.

In addition, a combustible substance may be added to the hydrotalcite compound particles. Examples of the combustible substance include wood chips, cork particles, coal powder, activated carbon, crystalline cellulose powder, starches, sucrose, gluconic acid, polyethylene glycol, polyvinyl alcohol, polyacrylamide, polyethylene, polystyrene and a mixture thereof. As the amount of the above combustible substance added is increased, the pore volume of the resulting molded product becomes larger. However, the addition of an excessive amount of the combustible substance tends to result in deteriorated strength of the resulting molded product. Therefore, the amount of the combustible substance added may be suitably controlled in view of a good strength of the resulting molded product.

Alternatively, the porous molded product may be formed into a honeycomb structure. In such a case, the honeycomb-shaped molded product may be obtained by an optional method selected according to the requirements.

<Function>

The reason why the porous molded product according to the present invention has a large specific surface area and an excellent mechanical strength is considered by the present inventors as follows.

That is, the porous molded product according to the present invention is produced by subjecting a precursor obtained by molding hydrotalcite in the form of a laminar composite hydroxide to calcination treatment. Therefore, upon the calcination treatment, water included in the hydrotalcite is removed therefrom to produce an oxide of magnesium and aluminum which includes a large amount of micropores. For this reason, the resulting molded product has very large specific surface area and pore volume. In addition, since water or carbonic ions being present between layers of the hydrotalcite are eliminated by the calcination to form pores, the pore size of pores formed in the molded product can be reduced.

For the above reason, the porous molded product according to the present invention can maintain a large specific surface area even when calcined at a high temperature and, therefore, can exhibit a high mechanical strength by the high-temperature calcination. As a result, it is possible to obtain a porous molded product having not only a large pore volume but also an excellent mechanical strength.

Thus, the porous molded product according to the present invention can exhibit a large specific surface area and a high mechanical strength even when held under a high temperature condition and, therefore, is useful as a carrier for catalysts which is used to support a catalyst component thereover in various catalyst such as steam reforming catalysts used in a high temperature condition, catalysts for production of dimethyl ether by dehydration of methanol, catalysts for CO shift reaction, catalysts for CO selective oxidation and methanation catalysts.

In addition, the porous molded product according to the present invention comprises a large amount of magnesium and, therefore, can be used as a carrier for a catalyst capable of reforming hydrocarbons such as city gases and LPG which comprise a large amount of sulfur components.

The porous molded product according to the present invention is satisfactory in both of a specific surface area and mechanical properties, and can be suitably used as filters, drying agents, adsorbents, purifying agents, deodorants, carriers for catalysts, etc.

EXAMPLES

Typical embodiments and examples of the present invention are as follows.

The contents of magnesium and aluminum were determined as follows. That is, a sample was dissolved in an acid, and the resulting solution was analyzed by a plasma emission spectroscopic device ("SPS-4000" manufactured by Seiko Denshi Kogyo Co., Ltd.).

The strength of the catalyst molded product was determined from an average value of strengths of the 100 molded products as measured using a digital force gauge.

The BET specific surface area was measured by nitrogen BET method.

The average pore diameter and the pore volume were determined by BJH method using "TriStar 3000" manufactured by Shimadzu Seisakusho Corp.

Example 1

Production of Hydrotalcite Compound Particles $MgSO_4 \cdot 7H_2O$ and $Al_2(SO_4)_3 \cdot 8H_2O$ in amounts of 4224.2 g and 1666.9 g, respectively, were dissolved in pure water to prepare 15000 ml of a mixed solution thereof. Separately, 6776 mL of an NaOH solution (concentration: 14 mol/L) were mixed with a solution in which 508.8 g of $Na_2CO_3$, were dissolved, to prepare 25000 mL of an alkali mixed solution. Then, the thus prepared alkali mixed solution was mixed with the mixed solution comprising the above magnesium salt and aluminum salt, and the resulting solution was aged at 80° C. for 8 hr to obtain a hydrous composite hydroxide. The resulting hydrous composite hydroxide was separated by filtration, dried, and then pulverized to obtain hydrotalcite compound particles. As a result, it was confirmed that the thus obtained hydrotalcite compound particles had a BET specific surface area of 45.2 cm$^2$/g, and the secondary agglomerated particles thereof obtained after subjecting the hydrotalcite compound particles to pulverization treatment had an average particle diameter of 10.5 μm.

<Production of Porous Molded Product>

Next, 1815 g of the hydrotalcite compound particles obtained above were mixed with 360.3 g of boehmite, 44.47 g of PVA, 353.9 g of water and 925.7 g of propylene glycol, and the resulting mixture was kneaded using a screw kneader for 1 hr. The thus obtained clayey kneaded material was formed into a spherical shape by a compression molding method, and the resulting spherical molded product was dried at 120° C. and heat-treated at 1100° C. for 5 hr. As a result, it was confirmed that the resulting porous molded product had a size of 5 mmϕ, a BET specific surface area of 42.5 m$^2$/g, an average pore diameter of 175 Å and a pore volume of 0.152 cm$^3$/g. In addition, as a result of analysis of the resulting porous molded product, it was confirmed that the Mg content therein was 30.66% by weight, the Al content therein was 26.01% by weight, and the average collapse strength thereof was 35.4 kg.

Example 2

$Mg(NO_3)_2 \cdot 6H_2O$ and $Al(NO_3)_3 \cdot 9H_2O$ in amounts of 2884.6 g and 2110.1 g, respectively, were dissolved in pure water to prepare 10000 ml of a mixed solution thereof. Separately, 4032 mL of an NaOH solution (concentration: 14 mol/L) were mixed with a solution in which 834.8 g of $Na_2CO_3$ were dissolved, to prepare 20000 ml of an alkali mixed solution. Then, the thus prepared alkali mixed solution was mixed with the mixed solution comprising the above magnesium salt and aluminum salt, and the resulting solution was aged at 60° C. for 6 hr to obtain a hydrous composite hydroxide. The resulting hydrous composite hydroxide was separated by filtration, dried, and then pulverized to obtain hydrotalcite compound particles. As a result, it was confirmed that the thus obtained hydrotalcite compound particles had a BET specific surface area of 105.2 cm$^2$/g, and the secondary agglomerated particles thereof obtained after subjecting the hydrotalcite compound particles to pulverization treatment had an average particle diameter of 35.2 μm.

Next, 1701 g of the hydrotalcite compound particles obtained above were mixed with 774.2 g of kaolinite, 313.9 g of methyl cellulose, 510.5 g of water and 1531.4 g of ethylene glycol, and the resulting mixture was kneaded using a screw kneader for 5 hr. The thus obtained clayey kneaded material was formed into a cylindrical shape by a extrusion molding method, and the resulting cylindrical molded product was dried at 120° C. and heat-treated at 700° C. for 18 hr. As a result, it was confirmed that the resulting porous molded product had a size of 3 mmϕ, a BET specific surface area of 98.3 m$^2$/g, an average pore diameter of 82.4 Å and a pore volume of 0.421 cm$^3$/g. In addition, as a result of analysis of the resulting porous molded product, it was confirmed that the Mg content therein was 16.14% by weight, the Al content therein was 27.48% by weight, and the average collapse strength thereof was 3.6 kg.

Example 3

$MgCl_2 \cdot 6H_2O$ and $AlCl_3 \cdot 9H_2O$ in amounts of 1488.3 g and 178.5 g, respectively, were dissolved in pure water to prepare 8000 ml of a mixed solution thereof. Separately, 6077 mL of an NaOH solution (concentration: 14 mol/L) were mixed with a solution in which 109.7 g of $Na_2CO_3$ were dissolved, to prepare 12000 mL of an alkali mixed solution. Then, the thus prepared alkali mixed solution was mixed with the mixed solution comprising the above magnesium salt and aluminum salt, and the resulting solution was aged at 160° C. for 8 hr to obtain a hydrous composite hydroxide. The resulting hydrous composite hydroxide was separated by filtration, dried, and then pulverized to obtain hydrotalcite compound particles. As a result, it was confirmed that the thus obtained hydrotalcite compound particles had a BET specific surface area of 15.2 cm$^2$/g, and the secondary agglomerated particles thereof obtained after subjecting the hydrotalcite compound particles to pulverization treatment had an average particle diameter of 25.2 μm.

Next, 665.5 g of the hydrotalcite compound particles obtained above were mixed with 59.23 g of talc, 62.89 g of starch, 146.4 g of water and 432.6 g of ethylene glycol, and the resulting mixture was kneaded using a screw kneader for 0.5 hr. The thus obtained clayey kneaded material was formed into a spherical shape by a press molding method, and the resulting spherical molded product was dried at 120° C. and heat-treated at 1300° C. for 10 hr. As a result, it was confirmed that the resulting porous molded product had a size of 2.2 mmϕ, a BET specific surface area of 12.2 m$^2$/g, an average pore diameter of 252.4 Å and a pore volume of 0.025 cm$^3$/g. In addition, as a result of analysis of the resulting porous molded product, it was confirmed that the Mg content therein was 44.34% by weight, the Al content therein was 9.348% by weight, and the average collapse strength thereof was 49.6 kg.

Example 4

$MgSO_4 \cdot 7H_2O$ and $Al(SO_4)_3 \cdot 8H_2O$ in amounts of 6521.9 g and 2924.8 g, respectively, were dissolved in pure water to prepare 18000 ml of a mixed solution thereof. Separately, 8359 mL of an NaOH solution (concentration: 14 mol/L) were mixed with a solution in which 892.7 g of $Na_2CO_3$ were dissolved, to prepare 17000 mL, of an alkali mixed solution. Then, the thus prepared alkali mixed solution was mixed with the mixed solution comprising the above magnesium salt and aluminum salt, and the resulting solution was aged at 95° C. for 5 hr to obtain a hydrous composite hydroxide. The resulting hydrous composite hydroxide was separated by filtration, dried, and then pulverized to obtain hydrotalcite compound particles. As a result, it was confirmed that the thus obtained hydrotalcite compound particles had a BET specific surface area of 72.1 cm$^2$/g, and the secondary agglomerated particles thereof obtained after subjecting the hydrotalcite compound particles to pulverization treatment had an average particle diameter of 7.6 μm.

Next, 2911 g of the hydrotalcite compound particles obtained above were mixed with 291.2 g of γ-alumina, 173.2 g of PVA, 960.8 g of water and 2183.8 g of glycerol, and the resulting mixture was kneaded using a screw kneader for 3.5 hr. The thus obtained clayey kneaded material was formed into a spherical shape by a compression molding method, and the resulting spherical molded product was dried at 120° C. and heat-treated at 1050° C. for 15 hr. As a result, it was confirmed that the resulting porous molded product had a size of 8.2 mmϕ, a BET specific surface area of 68.2 m$^2$/g, an average pore diameter of 125 Å and a pore volume of 0.224 cm$^3$/g. In addition, as a result of analysis of the resulting porous molded product, it was confirmed that the Mg content therein was 32.63% by weight, the Al content therein was 24.27% by weight, and the average collapse strength thereof was 11.25 kg.

Comparative Example 1

MgO, γ-alumina, PVA and water in amounts of 825.2 g, 10.52 g, 124.3 g and 436.8 g, respectively, were mixed with each other, and the resulting mixture was kneaded using a screw kneader for 2 hr. The thus obtained clayey kneaded material was formed into a spherical shape by a compression molding method, and the resulting spherical molded product was dried at 120° C. and heat-treated at 1250° C. for 4 hr. As a result, it was confirmed that the resulting molded product had a size of 3.5 mmϕ, a BET specific surface area of 2.2 m$^2$/g, an average pore diameter of 342 Å and a pore volume of 0.012 cm$^3$/g. In addition, as a result of analysis of the resulting molded product, it was confirmed that the Mg content therein was 59.41% by weight, the Al content therein was 0.785% by weight, and the average collapse strength thereof was 4.15 kg.

Comparative Example 2

A mixture prepared by mixing 1231.2 g of γ-alumina with 59.61 g of PVA was granulated using a rolling granulator while spraying water thereover to obtain a spherical γ-alumina molded product. The resulting spherical γ-alumina molded product was dried at 120° C. and heat-treated at 850° C. for 10 hr. As a result, it was confirmed that the resulting molded product had a size of 2.2 mmϕ, a BET specific surface area of 185.5 m$^2$/g, an average pore diameter of 54.2 Å and a pore volume of 0.512 cm$^3$/g. In addition, as a result of analysis of the resulting molded product, it was confirmed that the Al content therein was 51.9% by weight, and the average collapse strength thereof was 0.8 kg.

Comparative Example 3

The hydrotalcite particles obtained in Example 1 and water in amounts of 1512 g and 1142 g, respectively, were mixed with each other, and the resulting mixture was kneaded using a screw kneader for 1 hr. The thus obtained clayey kneaded material was formed into a spherical shape by a compression molding method, and the resulting spherical molded product was dried at 120° C. and heat-treated at 1100° C. for 5 hr. As a result, it was confirmed that the resulting porous molded product had a size of 5 mmϕ, a BET specific surface area of 52.4 m$^2$/g, an average pore diameter of 142 Å and a pore volume of 0.182 cm$^3$/g. In addition, as a result of analysis of the resulting molded product, it was confirmed that the Mg content therein was 40.03% by weight, the Al content therein was 17.78% by weight, and the average collapse strength thereof was 0.2 kg.

Various properties of the porous molded products obtained in the above Examples and Comparative Examples are shown in Table 1.

TABLE 1

| Examples and Comp. Examples | Hydrotalcite compound | | Porous molded product | |
|---|---|---|---|---|
| | BET specific surface area (m$^2$/g) | Average particle diameter (Secondary agglomerated particles) (nm) | Size (mm) | BET specific surface area (m$^2$/g) |
| Example 1 | 45.2 | 10.5 | 5.0 | 42.5 |
| Example 2 | 105.2 | 35.2 | 3.0 | 98.3 |
| Example 3 | 15.2 | 25.2 | 2.2 | 12.2 |
| Example 4 | 72.1 | 7.6 | 8.2 | 68.2 |
| Comp. Example 1 | — | — | 3.5 | 2.2 |
| Comp. Example 2 | — | — | 2.2 | 185.5 |
| Comp. Example 3 | 45.2 | 10.5 | 5.0 | 52.4 |

| Examples and Comp. Examples | Porous molded product | | |
|---|---|---|---|
| | Average pore diameter (Å) | Pore volume (cm$^3$/g) | Average collapse strength (kg) |
| Example 1 | 175 | 0.152 | 35.4 |
| Example 2 | 82.4 | 0.421 | 3.6 |
| Example 3 | 252.4 | 0.025 | 49.6 |
| Example 4 | 125 | 0.224 | 11.25 |
| Comp. Example 1 | 342 | 0.012 | 4.15 |
| Comp. Example 2 | 54.2 | 0.512 | 0.8 |
| Comp. Example 3 | 142 | 0.182 | 0.2 |

Use Example 1

Ni as a catalytic active component was supported on the porous molded product obtained in Example 1, and the resulting catalyst was used in steam reforming reaction to evaluate a catalyst performance thereof. Meanwhile, upon supporting Ni, nickel nitrate was supported on the porous molded product by an impregnation method, and then subjected to calcination and reduction treatment to produce a steam reforming reaction catalyst. As a result, it was confirmed that the Ni content in the Ni-supporting porous molded product was 17.2% by weight, and the metallic Ni fine particles supported on the molded product had a size of 3 nm.

<Evaluation of Catalytic Activity>

The above Ni-supporting porous molded product was used in steam reforming reaction to evaluate a catalytic activity thereof. In this case, a catalyst tube was prepared by filling a stainless steel reaction tube having a diameter of 20 mm with 10 cc of the catalyst.

The steam reforming reaction was carried out by flowing a methane gas and steam through the catalyst tube (reactor) at a reaction temperature of 300 to 700° C. and a space velocity of $3000^{-1}$.

The catalyst performance was evaluated by using the C1 conversion rate represented by the following formula:

$$\text{C1 Conversion Rate} = (CO+CO_2)/(CO+CO_2+CH_4)$$

In Table 2, there is shown the relationship between the reaction temperature (300 to 700° C.) and the C1 conversion rate when the steam reforming reaction was carried out using a pure methane gas as a raw material gas under the conditions including a GHSV of $3000^{-1}$ and $10000^{-1}$, a steam/carbon ratio (S/C) of 3.0 and a reaction time of 24 hr.

Use Example 2

Ni as a catalytic active component was supported on the molded product obtained in Comparative Example 1, and the resulting catalyst was used in steam reforming reaction to evaluate a catalyst performance thereof. Meanwhile, upon supporting Ni, nickel nitrate was supported on the molded product by an impregnation method, and then subjected to calcination and reduction treatment to produce a steam reforming reaction catalyst. As a result, it was confirmed that the Ni content in the Ni-supporting molded product was 17.6% by weight, and the metallic Ni fine particles supported on the molded product had a size of 38 nm.

Use Example 3

Ni as a catalytic active component was supported on the molded product obtained in Comparative Example 3, and the resulting catalyst was used in steam reforming reaction to evaluate a catalyst performance thereof. Meanwhile, upon supporting Ni, nickel nitrate was supported on the molded product by an impregnation method, and then subjected to calcination and reduction treatment to produce a steam reforming reaction catalyst. As a result, it was confirmed that the Ni content in the Ni-supporting molded product was 16.7% by weight, and the metallic Ni fine particles supported on the molded product had a size of 8 nm. The molded product was broken and powdered after completion of evaluation for the catalyst performance.

TABLE 2

| Use Examples | Reaction temperature (° C.) | GHSV = 3000 h$^{-1}$ C1 conversion rate (%) | GHSV = 10000 h$^{-1}$ C1 conversion rate (%) |
| --- | --- | --- | --- |
| Use Example 1 | 300 | 6.6 | 6 |
| (Example 1) | 400 | 19.9 | 18.7 |
|  | 500 | 43.6 | 42.5 |
|  | 600 | 76.8 | 75.5 |
|  | 700 | 97.1 | 95.9 |
| Use Example 2 | 300 | 2.2 | 0.3 |
| (Comp. | 400 | 11.1 | 6.2 |
| Example 1) | 500 | 35.2 | 22.1 |
|  | 600 | 69.4 | 49.5 |
|  | 700 | 84.5 | 73.2 |

TABLE 2-continued

| Use Examples | Reaction temperature (° C.) | GHSV = 3000 h$^{-1}$ C1 conversion rate (%) | GHSV = 10000 h$^{-1}$ C1 conversion rate (%) |
| --- | --- | --- | --- |
| Use Example 3 | 300 | 5.9 | 3.5 |
| (Comp. | 400 | 16.8 | 16.2 |
| Example 3) | 500 | 40.2 | 38.2 |
|  | 600 | 73.6 | 71.5 |
|  | 700 | 93.5 | 88.5 |

As shown in Table 2, it was confirmed that the catalysts using the porous molded products according to the present invention exhibited a high conversion rate and was capable of maintaining a high mechanical strength.

INDUSTRIAL APPLICABILITY

The porous molded product according to the present invention comprises at least magnesium and aluminum, and can exhibit a large BET specific surface area and a large pore volume as well as is excellent in mechanical strength. Thus, the porous molded product according to the present invention is satisfactory in both of a specific surface area and mechanical properties, and therefore can be suitably used as filters, drying agents, adsorbents, purifying agents, deodorants, carriers for catalysts, etc.

The invention claimed is:

1. A porous molded product comprising at least magnesium and aluminum, and having a magnesium content of 10 to 50% by weight in terms of a magnesium atom, an aluminum content of 5 to 35% by weight in terms of an aluminum atom provided the molar ratio of the magnesium atom to the aluminum atom (Mg:Al) is 5:1 to 1:1, a pore volume of 0.01 to 0.5 cm$^3$/g, an average pore diameter of not more than 300 Å and an average collapse strength of not less than 3 kg.

2. A porous molded product according to claim 1, wherein the molded product has a BET specific surface area of 10 to 100 m$^2$/g.

3. A porous molded product according to claim 1, wherein the molded product is produced by molding hydrotalcite comprising at least magnesium and aluminum and then calcining the resulting molded product at a temperature of 500 to 1500° C.

4. A carrier for catalysts comprising the porous molded product as defined in claim 1.

5. A catalyst produced by using the porous molded product as defined in claim 1.

6. A porous molded product according to claim 1, wherein the magnesium content is 15 to 50% by weight in terms of a magnesium atom.

7. A porous molded product according to claim 1, wherein the magnesium content is 20 to 50% by weight in terms of a magnesium atom.

8. A porous molded product according to claim 1, having an average collapse strength of 4 to 50 kg.

9. A porous molded product according to claim 1, having a spherical shape whose size of 1 to 10 mm.

* * * * *